3,193,457
ORAL ADMINISTRATION OF 6,16α-DIMETHYL-PROGESTERONES
Fred A. Kincl, Mexico City, Mexico, assignor, by mesne assignments, to Syntex Corporation, a corporation of Panama
No Drawing. Filed Jan. 3, 1962, Ser. No. 164,183
Claims priority, application Mexico, June 7, 1961, 63,021
3 Claims. (Cl. 167—55)

The present invention relates to certain hormone compositions possessing therapeutic activity by the oral route.

More specifically, it relates to novel compositions of estrogenic and progestational activity including 6α,16α-dimethylprogesterone and 6β,16α-dimethylprogesterone, and to the process of administration of such compositions in human clinic.

The present invention serves the object of providing antiestrogenic and progestational compositions which are effective by oral administration, thus greatly simplifying the treatment of patients in a special state of sensitivity and mental stress, and who often show an exaggerated dislike for a parenteral treatment.

Progesterone, the active principle of the corpus luteum, is widely used in medicine for its progestational activity; other compounds are also known which possess such activity; however, their clinical use is limited since they exhibit little or no activity when administered orally. In the U.S. Patent No. 2,965,541 there is described the use of pharmaceutical compositions of 17α-acetoxyprogesterone as progestational agents active by the oral route.

Progesterone also exhibits a certain degree of anti-estrogenic activity. Thus, for example, in the standard test for anti-estrogenic activity in young rats [I. R. Dorfman et al., Endocrinology, 68, pages 17–24 and 43–49 (1961)], it is necessary to administer 500 μg. of progesterone or testosterone by subcutaneous route to inhibit partially the effects of 0.4 μg. of estrone. When progesterone is administered orally, even when doubling this dose, no effect is observed.

The hormones most commonly employed so far clinically as anti-estrogenic agents are: testosterone in doses varying from 50 to 300 mg., or 17α-methyltestosterone in doses of 5 to 10 mg. daily; however, the prolonged administration of these hormones causes very undesirable side effects.

There is also employed progesterone by injection, but its use is not recommended since very high doses are required, which sometimes cause sensitization to the oil or any other vehicle employed for preparing the injection.

The preparation of 6α,16α-dimethylprogesterone and 6β,16α-dimethylprogesterone has been described by R. P. Graber and collaborators in Chem. and Ind., No. 48, page 1478 (1960).

The surprising discovery has been made that compositions containing 6α,16α-dimethylprogesterone or 6β,16α-dimethylprogesterone possess a great anti-estrogenic and progestational activity; more surprisingly, we have found that these compositions are active when administered by the oral route.

Such compositions are useful for the treatment of hormonal disorders associated with the increase of estrogens in the female.

In view of their remarkable progestational activity, these compositions are useful in the treatment of several disorders associated with progestational deficiency in the female.

In the standard anti-estrogenic test with young rats, 6α,16α-dimethylprogesterone and 6β,16α-dimethylprogesterone produced inhibition of the effect of estrone when administering 1/25 the dose of progesterone, i.e., it is only needed 20 μg. approximately of these compounds administered by the oral or parenteral route to produce anti-estrogenic effect.

Besides the properties set forth above, the compositions containing 6α,16α-dimethylprogesterone or 6β,16α-dimethylprogesterone do not exhibit undesirable androgenic side effects. These compositions are also useful in veterinary medicine, as for example for the control of ovulation in animals.

In the present invention pharmaceutical compositions are administered in precise and convenient unit doses; these types of unit doses may be easily varied or alternated with placebos for diagnostic observation.

It has been found that the convenient oral dose of 6α or 6β,16α-dimethylprogesterone may vary between 1 and 25 mg. daily. However, higher or lower doses are also practical, depending on the degree and severity of the illness. In those cases where a minimum response is required, then doses of 1 to 5 mg. daily are employed. In higher doses it is convenient to prepare compositions in divisible units, for example, as scored tablets.

The term "unit dose" as employed in the present specification refers to the pharmaceutical form which contains a certain amount of active material necessary to produce the desired therapeutic effect.

Examples of these unit doses are tablets, capsules, pills, powders, covered pills or tablets, and the like.

In the case of liquid compositions such as solutions, emulsions, syrups, and so on, the "unit dose" is a teaspoonful or a tablespoonful.

The solid compositions such as tablets, capsules, etc., include convenient ingredients for their manufacture, such as corn starch, lactose, talc, stearic acid, magnesium stearate, resins, etc.

The tablets or pills may be stratified. This form of preparation has the advantage of prolonging and retarding the therapeutic action of the drug. For example, the tablet or pill may have an inside dose and another outisde dose, the latter wrapping the former. The two doses may be separated by an enteric layer. The dividing layer serves to resist the disintegrating action in the stomach and allows the inside dose to have a retarding action or to pass intact into the duodenum. A great variety of materials may be employed for the enteric covering layers, especially polymeric acids or mixtures containing these acids, such as shellac, shellac-lanolin, shellac-caster oil, cellulose polycarboxylic esters, cellulose phthalate-starch and similar compounds.

The liquid forms include aqueous solutions, syrups, suspensions, emulsions with edible oils such as cotton seed oil, sesame oil, cocoanut oil, peanut oil and other vegetable oils. As emulsifying agents there are included the natural and synthetic gums such as tragacanth gum, acacia, gelatines, dextrine, sodium carboxymethylcellulose, polyethylene glycol, polyvinylpyrrolidone.

The following examples serve to illustrate but are not intended to limit the scope of the invention.

EXAMPLE I

A solution of 3 g. of 6β,16α-dimethyl-pregnan-5α-ol-3,20-dione, described for example by R. P. Graber et al. in Chem. and Ind., 48, 1478 (1960), in 250 ml. of methanol was treated with 125 ml. of a 5% aqueous solution of potassium hydroxide and the mixture was heated on the steam bath under an atmosphere of nitrogen for 15 minutes.

After cooling and neutralizing with acetic acid the mixture was concentrated to a small volume under reduced pressure and water was added until complete precipitation of the product, which was collected, washed with water and finally dried, thus affording 2.6 g. of the crude product, M.P. 160–170° C., $[\alpha]_D$ +117° (chloroform). Several recrystallizations from acetone-ether furnished 6β,16α-dimethylprogesterone in pure form, M.P. 179–182° C., [α]$_D$ +113° (chloroform), $\lambda_{max.}^{EtOH}$ 242 mμ, log E 4.21

EXAMPLE II

Pharmaceutical preparation containing 6β,16α-dimethylprogesterone, in the form of tablets.

One thousand tablets containing each approximately 10 mg. of 6β,16α-dimethylprogesterone are prepared in accordance with the following formula:

*Materials*

| | G. |
|---|---|
| 6β-16α-dimethylprogesterone | 10 |
| Lactose | 60 |
| Colloidal silicic acid with hydroylzed starch | 20 |
| Wheat starch | 41 |
| Arrow-root | 15 |
| Magnesium stearate | 2 |
| Talc | 3 |

*Preparation*

The 6β,16α-dimethylprogesterone is triturated with the lactose to form an homogeneous powder. In a mixing machine there is placed the above mixture and there is added the silicic acid, hydrolyzed starch, wheat starch and water until an homogeneous paste is formed, which is dried and granulated by the usual method. The dry granulate is pressed with arrow-root (as disintegrating agent), magnesium stearate and talc (as lubricants) to form in this manner tablets containing approximately 10 mg. of active substance. 1 to 3 tablets daily produce a favorable antiestrogenic effect.

EXAMPLE III

The method described above for preparing 10 mg. tablets was repeated but only using 5 mg. of 6β,16α-dimethylprogesterone as active substance (5 g. for one thousand tablets).

EXAMPLE IV

Pharmaceutical preparation containing 6β,16α-dimethylprogesterone in gelatine capsules.

Formula of one thousand capsules:

| | G. |
|---|---|
| 6β,16α-dimethylprogesterone | 15 |
| Starch or any other vehicle | 25 |

The capsules are prepared in the conventional manner, first mixing the finely divided powder of the active material with vehicles (starch, talc, stearic acid or magnesium stearate) and then encapsulating. There are thus obtained capsules containing approximately 15 mg. of 6β,16α-dimethylprogesterone. They are employed in the clinic with good results in cases of dysmenorrhea.

EXAMPLE V

Pharmaceutical preparation containing 6β,16α,-dimethylprogesterone as aqueous suspension.

An aqueous suspension for oral use containing in 5 ml. (approximately one teaspoonful) 25 mg. of 6β,16α-dimethylprogesterone, is prepared in the following manner:

| | | |
|---|---|---|
| 6β,16α-dimethylprogesterone | g | 5 |
| Citric acid, USP | g | 2 |
| Benzoic acid, USP | g | 1 |
| Methyl-paraben, USP | g | 2 |
| Propyl-paraben, USP | g | 0.5 |
| Glycerol, USP | ml | 150 |
| Powdered tragacanth gum | g | 7.5 |
| Flavoring essential oil | ml | 0.2 |
| Sucrose, USP | g | 400 |

Distilled water, sufficient for 1000 ml.

The citric acid is dissolved in 500 ml. of water. In another container there is placed the glycerol and there are added the benzoic acid and the parabens and then the 6β,16α-dimethylprogesterone finely powdered, and then the tragacanth gum and the essential oil in the indicated order. After grinding until an homogeneous mass is obtained there is added the aqueous solution with vigorous stirring. Finally the sucrose is added and the resulting mixture is perfectly stirred in a colloidal mill until an homogeneous suspension is obtained.

The rest of the water is then added to complete 1000 ml.

From 1 to 2 teaspoonful taken daily produce a favorable effect in the treatment of diseases of hyperestrogenic origin.

EXAMPLE VI

Pharmaceutical preparation containing 6α,16α-dimethylprogesterone in the form of tablets.

One thousand tablets containing each 10 mg. of 6α,16α-dimethylprogesterone are prepared in the following manner:

| | G. |
|---|---|
| 6α,16α-dimethylprogesterone | 10 |
| Lactose | 120 |

The 6α,16α-dimethylprogesterone and the lactose, finely powdered, are well mixed and granulated in acccordance with the technique described in Example II; the dry granules are tableted with starch and calcium stearate. Finally the potency is determined. These tablets are employed clinically in dysmenorrhea and hyperestrogenism, with doses of 1 to 3 tablets daily.

EXAMPLE VII

Pharmaceutical preparation containing 6α,16α-dimethylprogesterone in the form of aqueous suspension.

This suspension for oral use contains in each 5 ml. (approximately one teaspoonful) 10 mg. of 6α,16α-dimethylprogesterone.

Formula for 1000 ml. of suspension:

| | | |
|---|---|---|
| 6α,16α-dimethylprogesterone, micronized | g | 2 |
| Citric acid, USP | g | 2 |
| Benzoic acid, USP | g | 1 |
| Methyl-paraben, USP | g | 2 |
| Propyl-paraben, USP | g | 0.5 |
| Glycerol, USP | ml | 150 |
| Tragacanth gum, USP | g | 7.5 |
| Flavoring essential oil | ml | 0.2 |
| Sucrose, USP | g | 400 |

Distilled water, sufficient for 1000 ml.

There was followed the method of preparation of Example V.

I claim:

1. The method of treating hormonal disorders involving estrogen increase in the human female which comprises orally administering to such subject a pharmaceutical composition containing a compound selected from the group consisting of 6β,16α-dimethylprogesterone and 6α,16α-dimethylprogesterone.

2. The method of treating hormonal disorders involving estrogen increase in the human female which comprises orally administering to such subject a pharmaceutical composition containing from 1 to 25 milligrams of 6β,16α-dimethylprogesterone.

3. The method of treating hormonal disorders involving estrogen increase in the human female which comprises orally administering to such subject a pharmaceutical composition containing from 1 to 25 milligrams of 6α,16α-dimethylprogesterone.

References Cited by the Examiner

UNITED STATES PATENTS

| 2,927,933 | 3/60 | Babcock et al. | 167—74 |
| 2,941,997 | 6/60 | Fried | 167—74 |

(Other references on following page)

UNITED STATES PATENTS

| | | | |
|---|---|---|---|
| 2,941,998 | 6/60 | Fried | 167—74 |
| 2,965,541 | 12/60 | Byrnes | 167—74 |
| 2,971,886 | 2/61 | Babcock et al. | 167—74 |

OTHER REFERENCES

Chemical Abstracts, vol. 51, 5241$^1$–5242$^b$, 1957.

Drug Trade News 32 (22), page 56, Nov. 4, 1957, entry "Prodox."

Graber et al.: Chemistry and Industry, Nov. 26, 1960, pages 1478–9.

Sala et al.: Acta Endocrinologica, 29, 508–512, 1958.

LEWIS GOTTS, *Primary Examiner*.

FRANK CACCIAPAGLIA, JR., *Examiner*.